US009807846B1

(12) United States Patent
Darányi et al.

(10) Patent No.: US 9,807,846 B1
(45) Date of Patent: Oct. 31, 2017

(54) PROTECTION CIRCUIT ASSEMBLY AND METHOD

(71) Applicant: GENERAL ELECTRIC COMPANY, Schenectady, NY (US)

(72) Inventors: Tamás Darányi, BudaPest (HU); Lajos Csibi, Érd (HU); Gábor Pap, BudaPest (HU)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 14/960,268

(22) Filed: Dec. 4, 2015

(51) Int. Cl.
*H05B 33/08* (2006.01)
*H05B 37/02* (2006.01)

(52) U.S. Cl.
CPC ....... *H05B 33/089* (2013.01); *H05B 37/0254* (2013.01); *H05B 33/0818* (2013.01); *H05B 33/0872* (2013.01)

(58) Field of Classification Search
CPC .... H05B 33/08; H05B 37/02; H05B 33/0845; H05B 33/0842; H05B 33/0848; H05B 33/0872; H05B 37/0227; H05B 37/0263; H05B 37/0281
USPC ............. 315/247, 185 S, 307–326, 224, 225, 315/209 R
See application file for complete search history.

(56) References Cited

U.S. PATENT DOCUMENTS

| 6,301,133 | B1 | 10/2001 | Cuadra et al. |
| 7,372,882 | B2 | 5/2008 | Chapuis |
| 7,764,479 | B2 | 7/2010 | Chitta et al. |
| 7,983,012 | B2 | 7/2011 | Chitta et al. |
| 8,040,648 | B2 | 10/2011 | Baudesson |
| 2012/0049765 | A1* | 3/2012 | Lu ........................... F21S 6/001 315/312 |

FOREIGN PATENT DOCUMENTS

| AU | 2012101415 B4 | 10/2012 |
| AU | 2013228035 A1 | 3/2015 |
| DE | 102009011225 B3 | 5/2010 |
| EP | 2412208 B1 | 8/2013 |
| WO | 2006111257 A1 | 10/2006 |
| WO | 2013024151 A1 | 2/2013 |

\* cited by examiner

*Primary Examiner* — Tuyet Vo
(74) *Attorney, Agent, or Firm* — Peter T. DiMauro; GE Global Patent Operation

(57) ABSTRACT

Single channel digital addressable lighting interface (DALI) systems can include a dedicated external power supply that operates in a constant voltage/constant current mode to meet requirements of the DALI bus. A lighting controller is powered from the DALI bus. In one embodiment of the inventive subject matter, a lighting system is provided that includes two or more control (e.g., DALI) buses and a multichannel power supply that can be used for powering a controller of the system with constant voltage and to power separate control buses with separate and constant current. In order to protect the controller and buses from overloads caused by miswiring or other erroneous conditions, a protection circuit assembly is provided.

20 Claims, 9 Drawing Sheets

PROTECTION CIRCUIT ASSEMBLY AND METHOD

FIELD

Embodiments of the inventive subject matter described herein relate to electric circuits that protect devices from damage or destruction.

DISCUSSION OF ART

Some electrical systems include controllers that control operations of other devices. Some of these systems can be lighting systems having a controller that communicates with light sources for controlling which light sources are activated or deactivated. The systems may include separate pathways or wires for supplying current to the light sources for powering the light sources and communicating with the light sources.

One example of such as system is a digital addressable lighting interface (DALI) lighting system. The light sources are wired to a controller with two wires. One wire is a control bus for communicating control signals from the controller to the light source for controlling operation of the light sources and for communicating feedback signals form the light source to the controller for informing the controller of the state of the light source. Another wire is a mains voltage line for supplying power to the light source to power the light source.

The wires of a DALI system for a light source can be provided in the same cable. This can cause the light source to be miswired to the controller, such as when the mains voltage line and the control bus are incorrectly connected to the controller to connections intended for the other of the control bus or the mains voltage line. As a result, the controller may receive too much voltage via the control bus and be damaged or destroyed by the voltage. This can significantly increase the cost of implementing or establishing a DALI lighting system.

BRIEF DESCRIPTION

In one embodiment, a lighting system includes plural protection circuits configured to be conductively coupled with a power supply that supplies current to plural light sources to power the light sources. The protection circuits are configured to receive an input voltage from the power supply and to conduct an output voltage to separate control buses that are conductively coupled with drivers of the light sources to conduct control signals to the drivers of the light sources for control of operation of the light sources. The system also includes a microcontroller configured to generate the control signals to control the operation of the light sources and plural transceiving circuits configured to receive the control signals from the microcontroller and to conduct the control signals to different groups of the light sources via the separate control buses. The protection circuits are separately connected to the separate control buses to conduct the output voltage from the power supply to the light sources. The protection circuits are configured to prevent an increase of voltage on a first control bus of the control buses from increasing voltage on a different, second control bus of the control buses.

In one embodiment, a method includes receiving an input voltage from a power supply at plural protection circuits conductively coupled with the power supply to supply current to plural light sources to power the light sources, conducting an output voltage from the protection circuits to separate control buses that are conductively coupled with drivers of the light sources, and communicating control signals from a microcontroller to the drivers of the light sources via plural transceiving circuits and the control buses for control of operation of the light sources. The control signals can be separately communicated to different groups of the light sources via the separate control buses for separate control of the different groups of the light sources. The method also can include preventing (with the protection circuits) an increase of voltage on a first control bus of the control buses from increasing voltage on a different, second control bus of the control buses.

In one embodiment, a protection circuit assembly includes positive and negative voltage input connections configured to be conductively coupled with a power supply and positive and negative voltage output connections configured to be conductively coupled with separate control buses that are connected with light source drivers and light sources. The control buses are configured to communicate control signals from a microcontroller to the light source drivers to control operation of the light sources. The assembly also can include a first semiconductor switch having a gate coupled with the positive voltage input connection, a source coupled with the negative voltage input connection, and a drain coupled with the negative output voltage connection, and a variable resistor thermally coupled with the first semiconductor switch and conductively coupled with the positive voltage input connection and the gate of the first semiconductor switch. The variable resistor has an electrical resistance that changes based on a change in temperature of the variable resistor. A temperature of the first semiconductor switch increases in response to a voltage being injected into the negative voltage output connection that exceeds a second designated, non-zero injected voltage threshold. The increasing temperature of the first semiconductor switch causes the temperature of the variable resistor to increase. The increasing temperature in the variable resistor increases the electrical resistance of the variable resistor to protect the controller from the voltage that is injected into the at least one of the output connections.

BRIEF DESCRIPTION OF THE DRAWINGS

Reference is now made briefly to the accompanying drawings, in which.

DETAILED DESCRIPTION

Figure 1:
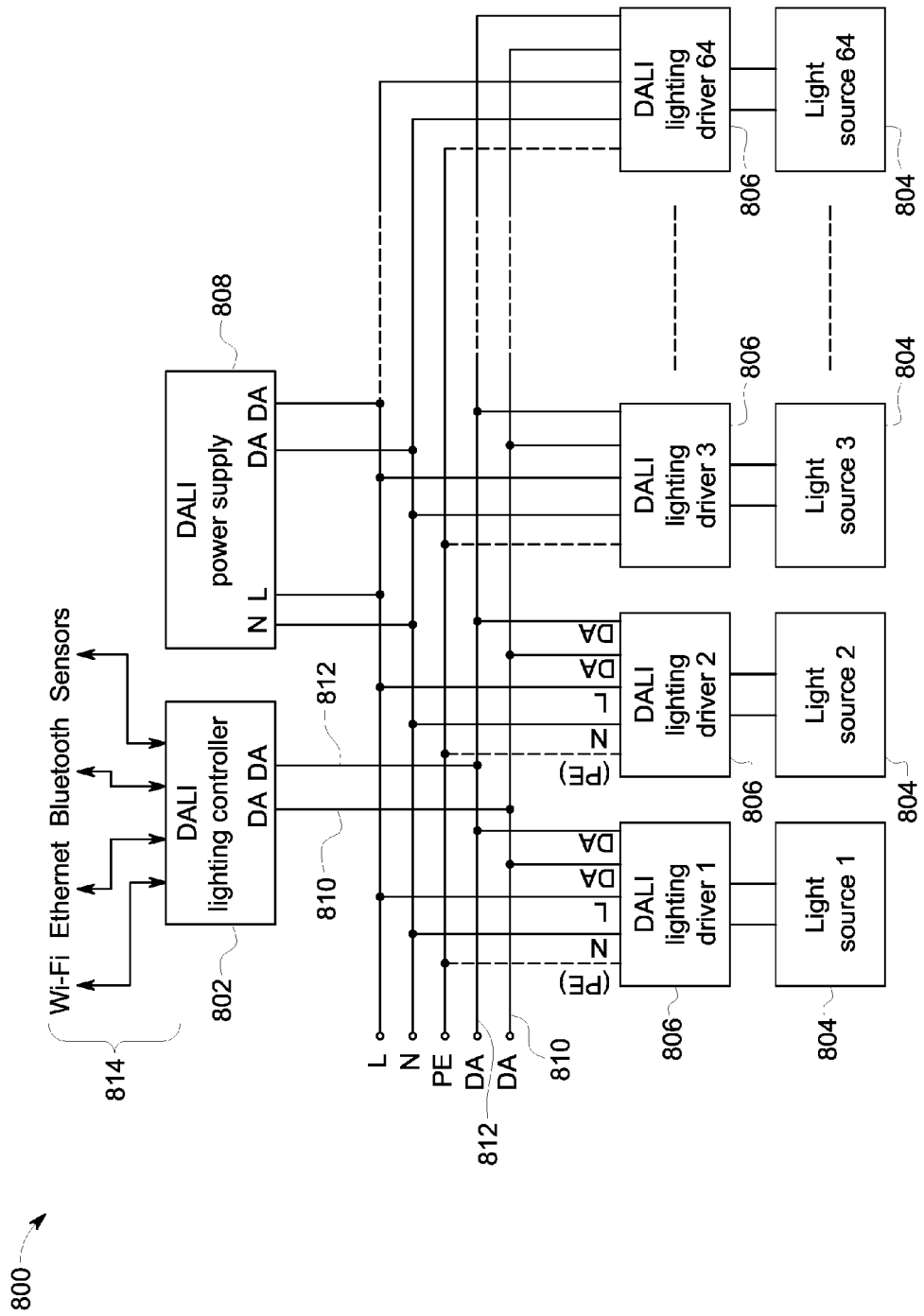
FIG. 1 illustrates a lighting control system 800 according to one example.

FIG. 1 illustrates a lighting control system 800 according to one example. The lighting control system 800 includes a lighting controller 802 (e.g., "DALI lighting controller" in FIG. 1) that controls operation of several light sources 804 (e.g., "Light source 1," "Light source 2," Light source 3," and "Light source 64" in FIG. 1) via control signals communicated to corresponding lighting drivers 806 (e.g., "DALI lighting driver 1," "DALI lighting driver 2," "DALI lighting driver 3," and "DALI lighting driver 64" in FIG. 1). A power supply 808 ("DALI power supply" in FIG. 1) powers the light sources 804 by conducting electric current to the light sources 804. The lighting system 800 can represent a digital addressable lighting interface (DALI) lighting system. The lighting system 800 includes several conductive buses for conducting control signals from the controller 802 to the drivers 806 and for conducting electric current from the power supply 808 to the light sources 804. These buses include digital addressable (DA) control lines 810, 812 and power supply lines L, N, PE as shown in FIG. 1. The crossing lines in FIG. 1 represent conductively coupled components if a node is shown. The controller 802 can receive input and/or provide output through a controller input/output interface 814, which may include a Wi-Fi interface, an Ethernet interface, a Bluetooth interface, and/or sensors. Control signals that dictate operation of the light sources 804 are conducted from the controller 802 to the drivers 806 via the control lines 810, 812, while current used to power the light sources 804 is conducted to the light sources 804 via the power supply lines.

The power demand of the drivers 806 and the internal logic and circuitry of the controller 802 are fed by a common, voltage regulated multichannel off-line power supply 808. This power supply 808 may be unable to operate in constant voltage and constant current mode at the same time (e.g., where a constant voltage and constant current are supplied from the power supply 808). In the event that one or more of the light sources 804 are incorrectly wired to the power supply lines and the control lines 810, 812, the lighting system 800 may be unable to protect the controller 802 or other components of the lighting system 800 from an overload condition.

In the single channel DALI example of the lighting system 800, the dedicated external DALI power supply 808 is used, which is designed to operate in constant voltage/constant current mode according to requirements of the DALI bus 810, 812. In this example, the lighting controller 802 is powered from the DALI data bus lines 810, 812 or may have another power supply because of the relatively high power consumption of the internal circuitry of the controller 802. A problem occurs when one wants to integrate all necessary modules in the controlling device, particularly when the controlled devices (e.g., the light sources) in a logical group need to be divided between two or more physical groups (e.g., independent strings, control buses) because of the large number of light sources. The size of a logically associated group of light sources can be limited in a DALI-based system 64.

In order to remedy these issues with the lighting system 800, one or more embodiments of the inventive subject matter described herein provide a protection circuit assembly. In contrast to the lighting system 800 shown in FIG. 1, one or more embodiments of the protection circuit assembly described herein separate the control channels (e.g., the control lines) from each other, thereby ensuring that at least one of the control channels remains operable in the event of an erroneous condition occurring on the other control channel, such as miswiring of a light source, an overload current, etc.

In one embodiment of the inventive lighting systems described herein, the lighting system includes two or more control (DALI) buses and other controlling and communicating functionalities, including the multichannel power supply, integrated in a compact device. As a regulated multichannel power supply may be limited to operating in constant voltage mode and unable to treat channel overloads separately, it may be necessary to apply a circuitry per control (DALI) channel to provide this characteristics and protection if the multichannel power supply is used for powering the controller with constant voltage and the separate control (DALI) buses with separate constant current.

In accordance with one or more embodiments described herein, a protection circuit assembly and method are provided to assist in preventing damage or destruction to components of lighting systems. In two-wire control bus systems that control operation of lights in a lighting system, there is a potential to miswire the wires to the lights, especially when the control bus (e.g., the conductive pathway through which control signals that control operation of the lights are conducted) and mains wires (e.g., the conductive pathways through which electric current is supplied to the lights to power the lights) share the same cable. One example of such a lighting system is the DALI lighting system shown in FIG. 1. The wires may be miswired when the mains wires and control bus that connect the lights with a controller of the lighting system are connected to the wrong connectors of the controller. Powering the lights in such a scenario can cause the controller to be damaged or destroyed.

The protection circuit assembly and method described herein provide circuitry that is tolerant to a situation where the control bus and mains wires are incorrectly connected with the controller. The circuitry can prevent the controller from being damaged in the incorrectly wired situation, while allowing the lighting system and lights in the lighting system to remain operational. The circuitry includes one or more variable transconductance elements to provide a constant voltage and constant current with a dissipated power limiter. The transconductance elements can include a variable resistor. The term constant may refer to a value that does not change with respect to time. For example, a constant voltage may be a voltage that does not change, or that does not change by more than noise oscillations (e.g., the changes are less than 1%, 5%, 10%, or the like, of the root mean square of the value) unless or until the input voltage changes.

Within normal working conditions, such as when the current that is input into the circuitry of the protection circuit is no greater than a designated transmission current threshold (e.g., 250 milliamps or another value), the protection circuit supplies current from a power supply to the control bus for one or more lights to power the lights in a normal constant voltage (CV) operating scenario. Outside of the normal working conditions, such as when the current that is input into the circuitry of the protection circuit reaches the designated transmission current threshold, the protection circuit changes operational modes to remain constant current (CC) mode. Within this mode, if a load duty cycle of the control bus exceeds a designated threshold (e.g., 80% or another limit), the protection circuit activates dissipation protection and begins dissipating the electric energy of the current provided from the power supply during the load duty cycle. If the voltage supplied from the power supply exceeds an upper designated limit (e.g., 30 volts of direct current or another amount), the protection circuit assembly may deactivate to stop conduction of current to the light or lights, and may consume a relatively small amount of energy for monitoring conditions of the bus (e.g., the conductive pathway or pathways that connect the protection circuit to the lights). The protection circuit assembly may then switch back to the normal operational mode responsive to the electric energy supplied to the protection circuit assembly returning to normal working conditions.

In one embodiment, the protection circuit assembly operates to provide a constant current to one or more lights connected with the circuit assembly, while also providing protection from overheating and overvoltages (e.g., voltages over a designated threshold), using a single solid state semiconductor switch, such as an n-type metal-oxide-semiconductor field effect transistor (nMOSFET). The circuit assembly can protect the controller of a lighting system from voltage stresses received on the output connections of the circuit assembly, such as which may occur when the power mains wires of the lights in the lighting system are connected to the control bus outputs of the circuit assembly. In one aspect, the circuit assembly can protect the controller from overvoltages received on these output of 250 volts (of a root mean square value of a 500 voltage direct current). Electronic feedback conducted from the lights in the lighting system to the output connections of the circuit assembly are prevented by the circuit assembly from being conducted onto the power supply connections that conduct electric current to the lights from the power supply via the circuit assembly in order to power the lights. The circuit assembly can switch between normal and protected modes of operation, where the normal mode of operation causes the circuit assembly to conduct current to the lights from the power supply and the protected mode of operation dissipates electric energy of the current provided by the power supply and optionally may deactivate to stop conduction of current to the lights. The protection circuit assembly may switch between these modes without transient currents being conducted to the lights. The circuit assembly may remain in the protected mode of operation without any time constraint in one embodiment. For example, the circuit assembly may switch to and remain in the protected mode of operation indefinitely or until incorrect wiring of one or more lights to the circuit assembly is corrected. The circuit assembly may autonomously switch from the protected mode of operation to the normal mode of operation without any operator intervention responsive to the wiring of the light(s) being corrected.

Figure 2:
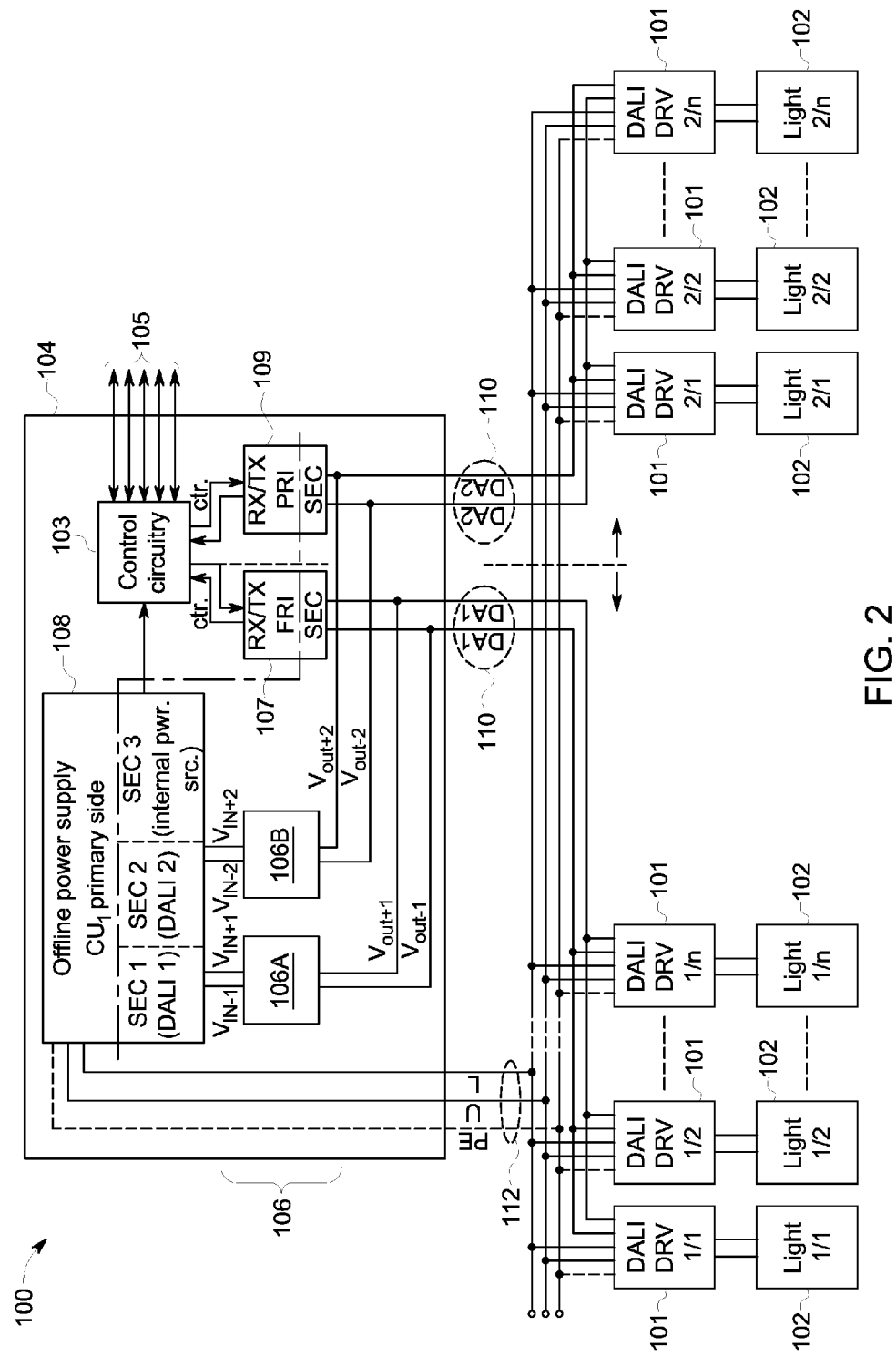
FIG. 2 illustrates a lighting control system 100 according to one embodiment of the inventive subject matter.

FIG. 2 illustrates a lighting control system 100 according to one embodiment of the inventive subject matter. The system 100 includes one or more light sources 102 ("Light 1/1," "Light 1/2," "Light 1/n," "Light 2/1," "Light 2/2," and "Light 2/n" in FIG. 2) that are conductively coupled with light bus drivers 101 ("DALI DRV 1/1," "DALI DRV 1/2," "DALI DRV 1/n," "DALI DRV 2/1," "DALI DRV 2/2," and "DALI DRV 2/n" in FIG. 2). The light sources 102 represent one or more devices that generate light, such as light bulbs, light emitting diodes, or the like.

The drivers 101 control operation of the light sources 102 based on signals received from control circuitry 103 of a multi-channel controller 104. The control circuitry 103 includes or represents hardware circuitry that includes and/or is connected with one or more processors (e.g., microcontrollers, microprocessors, field programmable gate arrays, integrated circuits, or other electronic logic-based devices) that operate to control activation and deactivation of the lights 102, to communicate signals to the lights 102, to receive signals from the lights 102, etc. The light sources 102 are powered by electric current received from a power supply 108 ("Offline power supply" in FIG. 2). The power supply 108 may not be included in the lighting system 100. For example, the power supply 108 may be a utility grid, one or more batteries, an alternator, a generator, or the like. Alternatively, the power supply 108 may be included in the lighting system 100. The power supply 108 may include different sections ("Sec 1," "Sec 2," and "Sec 3" in FIG. 2) that supply current to different components. For example, a first section of the power supply 108 may supply current to the light sources 102 connected to first control channels or lines DA1, a second section of the power supply 108 may supply current to the light sources 102 connected to different, second control channels or lines DA2, and a third section of the power supply 108 may operate as an internal power source to the controller 104.

The control circuitry 103 may receive input and/or provide output from the controller 104 via one or more input/output connections 105, such as a Wi-Fi connection, an Ethernet connection, a Bluetooth connection, a connection with one or more sensors, etc. Control signals may be communicated from the control circuitry 103 to the drivers 101 to control operation of the light sources 102 and/or feedback signals may be communicated from the light sources 102 to the control circuitry 103 through transceiving circuits 107, 109. The transceiving circuits 107 ("Rx/Tx PR1 SEC" in FIG. 2) may communicate signals with the drivers 101 and light sources 102 coupled with the first control lines DA1 while the transceiving circuitry 109 ("Rx/Tx PR2 SEC" in FIG. 2) may communicate signals with the drivers 101 and light sources 102 coupled with the second control lines DA2. The control lines DA1, DA2 may be referred to as control buses 110.

The power supply 108 conducts electric current to the light sources 102 in order to power the light sources 102 via power supply lines PE, V, L and to the protection circuit assembly 106 via power supply lines $V_{IN-1}$, $V_{IN+1}$, $V_{IN-2}$, $V_{IN+2}$. The power supply lines PE, V, L may be referred to as mains voltage lines 112. The protection circuit assembly 106 may include different circuits 106A, 106B for different groups of the light sources 102. For example, the circuit 106A may connect the power supply lines $V_{IN-1}$, $V_{IN+1}$ with the light sources 102 and drivers 101 controlled by control signals received via the control lines DA1 and the circuit 106B may connect the power supply lines $V_{IN-2}$, $V_{IN+2}$ with the light sources 102 and drivers 101 controller by control signals received via the control lines DA2. As shown in FIG. 2, the protection circuits 106A, 106B receive input voltages from the power supply 108 via the power supply lines $V_{IN-1}$, $V_{IN+1}$, $V_{IN-2}$, $V_{IN+2}$ and conduct output voltages to drivers 101 of the light sources 102 via the control buses DA1, DA2.

The system 100 may provide for galvanic isolation between different components or groups of components to allow for the light sources 102 connected with the controller 104 via one control bus DA1 or DA2 to be separately and independently controlled relative to the light sources 102 connected with the controller 104 via one control bus DA2 or DA1. For example, the transceiving circuits 107, 109 may be galvanically isolated from each other, the portions or sections of the power supply 108 that conduct current to the different protection circuits 106A, 106B may be galvanically isolated from each other, and the control buses DA1, DA2 may be galvanically isolated from each other. These components may be galvanically isolated from each other by connecting the various components of the system 100 such that no direct conduction path exists between the components that are galvanically isolated from each other.

In one embodiment, the circuit assembly 106 may be separate from (e.g., outside of) the controller 104 but conductively coupled with the circuit assembly 106 and the light sources 102 in a location between the circuit assembly 106 and the light sources 102. In one embodiment, the lighting system 100 is a DALI lighting system with the light sources 102 being digitally addressable and controllable by the controller 104.

Because the current supplied from the power supply may be much larger in magnitude than the control signals and/or feedback signals (e.g., the power supply signals may be several orders of magnitude larger than the control signals), connecting a wire to the wrong connector can damage the controller 104. For example, connecting a mains voltage line 112 for a light source 102 to the connector used for the control bus 110 for that light source 102 can damage or destroy the controller 104. At least one embodiment of the protection circuit assembly 104 that is described herein can allow for such a miswiring of the control bus 110 and mains voltage line 112 for a light source 102 while preventing damage or destruction of the controller 104.

In one embodiment, the controller 104 can operate to control two independent lighting system buses. One system bus includes the light sources 102 connected with the control buses DA1 via the drivers 101 and another system bus includes the light sources 102 connected with the control buses DA2 via the drivers 101. The power supply 108 can provide current to power the light sources 102 connected with the independent buses, such as by providing 18 volts of direct current to each bus (or another current). The transceiving circuitry 107 may be separate from the transceiving circuitry 109 to allow for the control circuitry 103 to separately communicate with the light sources 102 connected with the separate buses. Additionally, the protection circuit assembly 106 may include separate circuits 106A, 106B for separately controlling and driving the light sources 102 on the different buses. If one or more light sources 102 connected with one bus are wired incorrectly or there is another erroneous condition, the controller 104 can separately protect the different buses to prevent an increase in voltage on one bus from damaging the components connected with the other bus or allowing the erroneous condition to affect the other bus.

Figure 3:
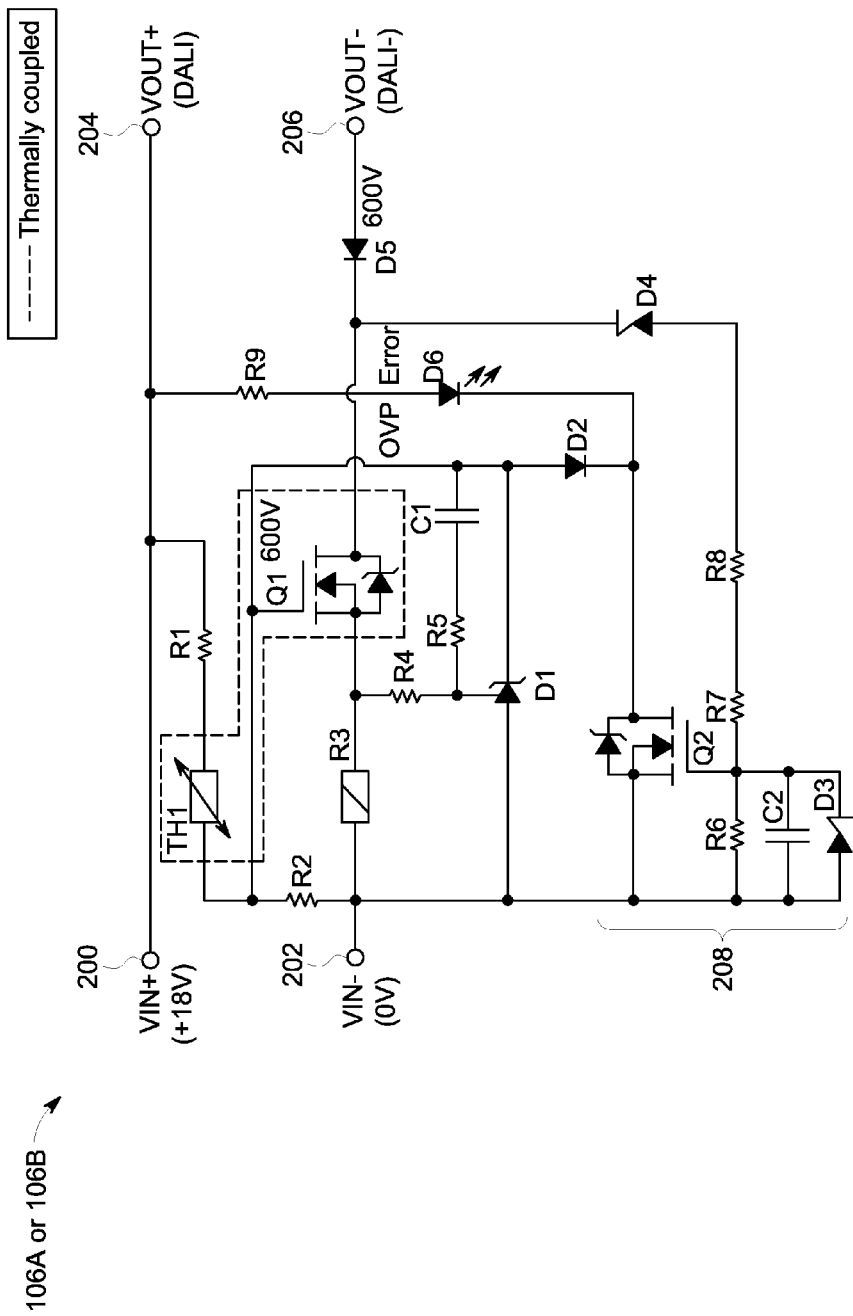
FIG. 3 illustrates one embodiment of a protection circuit of a protection circuit assembly shown in FIG. 2.

FIG. 3 illustrates one embodiment of the protection circuit assembly 106. The circuit shown in FIG. 2 may represent at least one of the circuits 106A, 106B shown in FIG. 2. The protection circuit assembly 106 includes input connections or connectors 200, 202 that are conductively coupled with the power supply 108 shown in FIG. 2 to receive current from the power supply 108. The connection 200 may receive a positive input voltage signal (e.g., the "$V_{IN+1}$" or the "$V_{IN+2}$" in FIG. 2) and the connection 202 may receive a negative or zero input voltage signal ("$V_{IN-1}$" or the "$V_{IN-2}$" in FIG. 2). In one embodiment, the positive voltage signal is 18 volts and the negative voltage signal is zero volts, but alternatively may be other voltages.

The protection circuit assembly 106 also includes output connections or connectors 204, 206 conductively coupled with the control buses DA1 or DA2 shown in FIG. 2. The connection 204 is a positive voltage output signal ("$V_{OUT+1}$" or "$V_{OUT+2}$" in FIG. 2) and the connection 206 is a negative voltage output signal ("$V_{OUT-1}$" or "$V_{OUT-2}$" in FIG. 2). The positive voltage output signal optionally may be referred to as "DALI+" and the negative voltage output signal optionally may be referred to as "DALI−".

The protection circuit assembly 106 includes a resistor R1 that is connected with the connection 200 in series with a variable resistor TH1. The variable resistor TH1 may be a thermistor that changes resistance with changing temperatures. The resistance of the variable resistor TH1 may increase with increasing temperatures and decrease with decreasing temperatures. For example, the variable resistor TH1 may be a positive temperature coefficient (PTC) resistor. The variable resistor TH1 is thermally coupled with a solid state semiconductor switch, such as an n-type MOSFET Q1, such as by connecting the variable resistor TH1 to the same structure, substrate, plate, or other body on which the MOSFET Q1 is mounted. For example, the temperature of the variable resistor TH1 may change in concert with or by similar amounts as the MOSFET Q1, such as by the variable resistor TH1 and the MOSFET Q1 being close to each other. A resistor R2 is located between the variable resistor TH1 and the connection 202 and between a node in the circuit assembly 106 between the variable resistor TH1 and the MOSFET Q1. A current sense resistor R3 is connected with the connection 204 and the MOSFET Q1 in a location between the connection 204 and the MOSFET Q1.

Plural resistors R4, R5 are connected in series with a capacitor C1. The series of resistors R4, R5 and the capacitor C1 is connected with the current sense resistor R3 and a source of the MOSFET Q1 in a location between the current sense resistor R3 and the source of the MOSFET Q1. The series of resistors R4, R5 and the capacitor C1 also is connected with a gate of the MOSFET Q1 and an anode of a switching diode D2 in a location between the gate of the MOSFET Q1 and the anode of the switching diode D2. A shunt regulator D1 is connected with the series of the resistors R4, R5 and the capacitor C1 in a location between the resistors R4, R5. The shunt regulator D1 also is connected with the connection 202 and with the anode of the diode D2 in a location between the gate of the MOSFET Q1 and the switching diode D2.

A drain of a second MOSFET Q2 is connected with a cathode of the switching diode D2. The source of the second MOSFET Q2 is connected with the connection 202. A series of resistors R6, R7, R8 is connected with the connection 202 and an anode of an avalanche diode D4. The avalanche diode D4 also may be referred to as an overvoltage sensing element or diode.

The series of resistors R6, R7, R8 also is connected with the gate of the MOSFET Q2 such that the gate is connected with the series between the resistors R6, R7. A capacitor C2 is connected with the resistors R6, R7, R8 in a location between the resistors R7, R8 such that the capacitor C2 is in parallel to the resistor R6. Another avalanche diode D3 is connected with the resistors R6, R7, R8 and with the capacitor C2 in a location between the resistors R7, R8 such that the avalanche diode D3 is in parallel to the capacitor C2 and the resistor R6.

The protection circuit assembly 106 includes an overvoltage protection stage 208 that is activated responsive to the protection circuit assembly 106 receiving large positive voltages on the control bus 110 (e.g., which may occur when a large positive voltage is received on the negative output voltage connection 206). The overvoltage protection stage 208 includes the avalanche diode D4, the MOSFET Q2, the resistors R6, R7, R8, the capacitor C2, and the avalanche diode D3. This overvoltage protection stage 208 may not conduct current within the protection circuit assembly 106 unless and until the voltage received on the control bus 110 is positive relative to the voltage received on the positive voltage output connection 204 and is relatively large, as described above. Responsive to receiving such a positive voltage on the connection 204, the overvoltage protection stage 208 may activate to dissipate the positive voltage while protecting the MOSFET Q1 from damage or destruction to prevent damage or destruction to the controller 104.

Optionally, a light emitting device, such as a light emitting diode (LED) D6 may be connected in series with a resistor R9. The LED D6 and the resistor R9 may be connected between the drain of the MOSFET Q2 and the connection 202. An anode of a series protection diode D5 is connected with the negative voltage output connection 206 with the cathode of the series protection diode D5 connected with the cathode of the diode D4 and the drain of the MOSFET Q1.

In operation, a voltage may be applied to the positive voltage input connection 200 with respect to the negative voltage input connection 202. This voltage can be a pre-regulated constant positive, such as between 18 and 20 volts of direct current. The combination of the resistor R1, the variable resistor Th1, and the resistor R2 operate as a voltage divider to reduce this input voltage and bias the MOSFET Q1. This biasing of the MOSFET causes a current to be conducted out of the protection circuit assembly 106 to the light source 102 via the output connections 204, 206. In one embodiment, the current that is conducted out of the protection circuit assembly is a nominal, short-circuited constant current of 250 milliamps (or another value) for transmitting control signals from the controller 104 to the light source 102 via the control buses 110 (e.g., DA1 or DA2).

Figure 4:
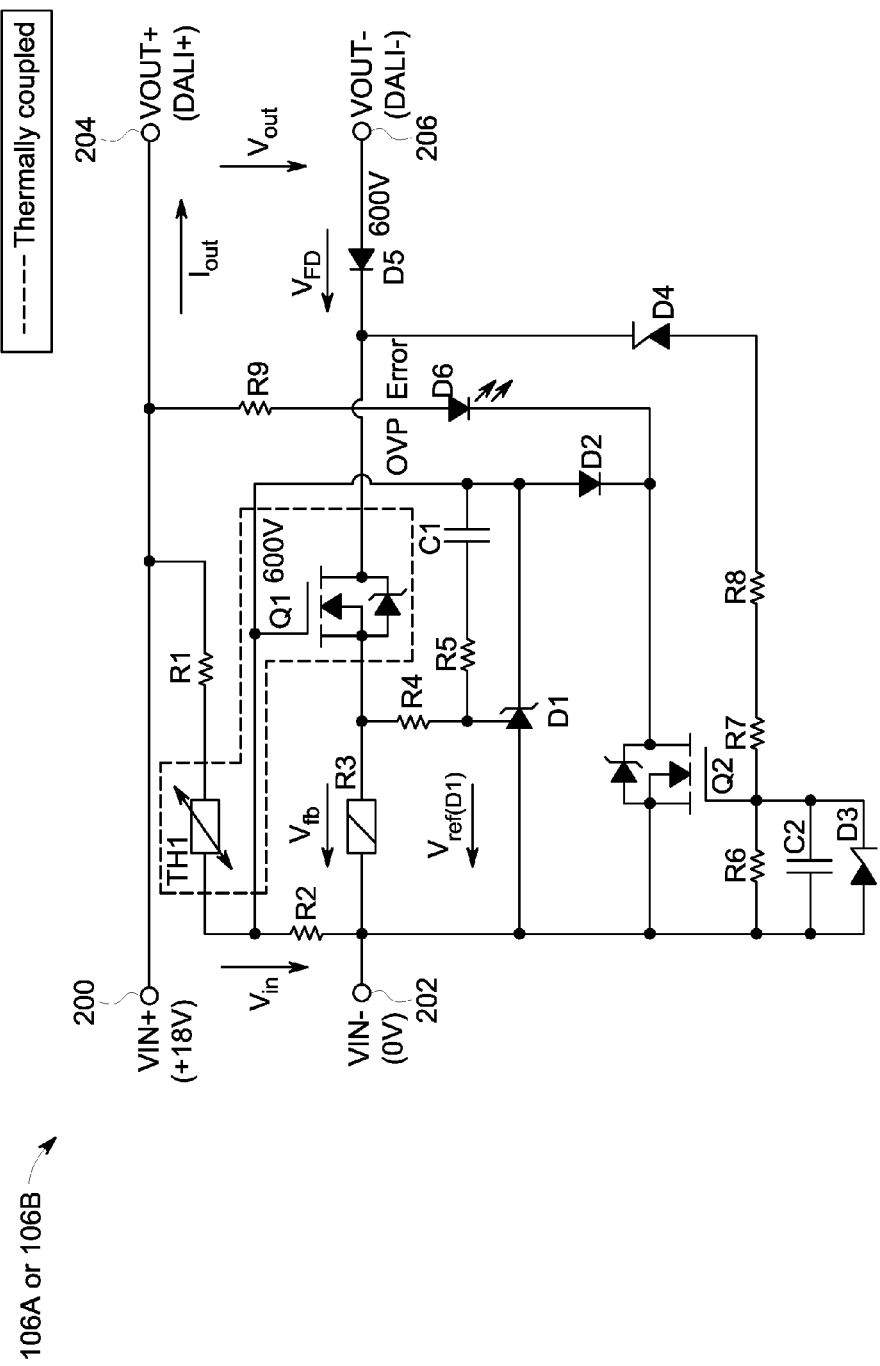
FIG. 4 illustrates the protection circuit of the protection circuit assembly shown in FIG. 2 operating during a normal mode of operation of the lighting system shown in FIG. 2 according to one embodiment.

FIG. 4 illustrates the protection circuit assembly 106 operating during a normal mode of operation of the lighting system 100 shown in FIG. 2 according to one embodiment. In the mode of operation shown in FIG. 4, the light source or sources 102 shown in FIG. 2 may be correctly wired to the control buses DA1, DA2 and power supply lines PE, V, L shown in FIG. 2 and one or more of the light sources 102 may be drawing current on the control buses DA1 or DA2 via the protection circuit assembly 106 to listen for control signals provided from the controller 104. An input voltage $V_{in}$ can be provided by the controller 104 by being drawn into the protection circuit assembly 106 from the light source(s) 102 across the input voltage connections 200, 202. An output current $I_{out}$ that is drawn by the light sources 102 may be below or well below a designated current transmit threshold such as 250 milliamps or another value.

A feedback voltage $V_{fb}$ conducted across the current sense resistor R3 is less than a reference voltage $V_{ref}$ of the stabilizer element (e.g., the shunt regulator D1. This causes a feedback voltage $V_{fb}$ conducted through the current sense resistor R3 to not change or significantly change the bias of the MOSFET Q1. The MOSFET Q1 may then remain in an active region and continue to conduct current in the circuit. The output voltage $V_{out}$ that is conducted to the light source(s) 102 via the control bus 110 across the output voltage connections 204, 206 is based on the input voltage Vin, a forward voltage $V_{fd}$ through the series protection diode D5 connected to the negative voltage output connection 206, a voltage across the drain and source of the MOSFET Q1 (referred to as Vas) and the feedback voltage $V_{fb}$. In one aspect, the output voltage Vout may be calculated as:

$$V_{out} = V_{in} - V_{fd(D5)} - V_{ds(Q1)} - V_{fb(R3)} \qquad \text{(Eqn. 1)}$$

where $V_{out}$ represents the output voltage conducted out of the protection circuit assembly 106 to one or more of the light sources 102 through the connections 204, 206, $V_{in}$ represents the input voltage supplied into the protection circuit assembly 106 by the controller 104 via the input voltage connections 200, 202, $V_{FD(D5)}$ represents the voltage conducted through the series protection diode D5, $V_{ds(Q1)}$ represents the voltage conducted across the source and drain regions of the MOSFET Q1, and $V_{fb(R3)}$ represents the voltage conducted through the resistor R3. Based on the resistances and other electrical characteristics of these components of the protection circuit assembly 106, the sum total of the voltage drop across these components is maintained below a designated threshold, such as three volts or another value. As a result, the voltage supplied to the light sources 102 out of the protection circuit assembly 106 on the control buses DA1 or DA2 via the connections 204, 206 is maintained to provide a constant voltage power source (e.g., a source that is less than three volts).

Figure 5:
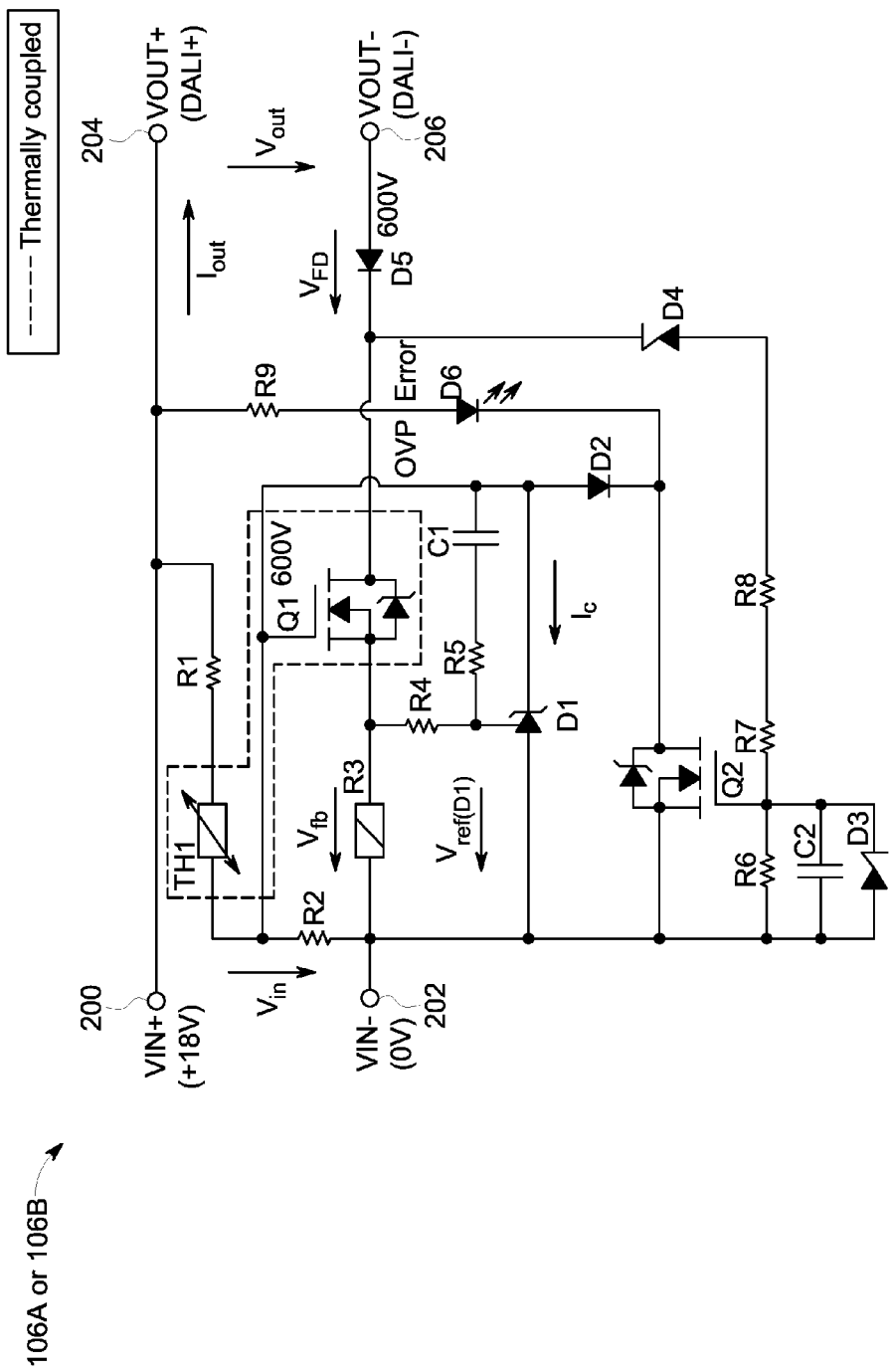
FIG. 5 illustrates another aspect of the protection circuit of the protection circuit assembly shown in FIG. 3 operating during the normal mode of operation of the lighting system shown in FIG. 2 according to one embodiment.

FIG. 5 illustrates another aspect of the protection circuit assembly 106 operating during the normal mode of operation of the lighting system 100 shown in FIG. 2 according to one embodiment. In the mode of operation shown in FIG. 5, the light source or sources 102 shown in FIG. 2 may be correctly wired to the control buses DA1 or DA2 and mains voltage lines PE, V, L shown in FIG. 2. In contrast to the mode of operation shown in FIG. 4 (where one or more of the light sources 102 is drawing current on the control buses DA1, DA2 to listen for a control signal from the controller 104), the controller 104 is communicating the control signal to one or more of the light sources 102 via the control buses DA1 or DA2 in FIG. 5.

In this scenario, the controller 104 terminates the control buses DA1, DA2 periodically and/or temporarily in such a way that the voltage between the output voltage connections 204, 206 is less than a designated voltage, such as 6.5 volts or another value. The MOSFET Q1 operates in the active region to conduct current in the protection circuit assembly such that the sum of the resistance of the MOSFET Q1 across the drain and source of the MOSFET Q1, the resistor R3, and the forward resistance of the series protection diode D5 is relatively small, such as a few ohms (e.g., less than ten ohms). With such a small resistance, the current conducted in this loop of the protection circuit assembly (e.g., the portion of the protection circuit assembly 106 extending from the negative output voltage connection 206 to the negative input voltage connection 202 through the current sense resistor R3, the MOSFET Q1, and the series protection diode D5 and from the positive input voltage connection 200 to the positive output voltage connection 204) could become relatively large, such as larger than a designated current threshold of 250 milliamps or another value.

But, when the current flowing in this loop increases to an upper threshold limit of the sense resistor R3, the feedback voltage $V_{fb}$ across the sense resistor is the same as the reference voltage $V_{ref}$ of the shunt regulator D1. This reference voltage causes a control current $I_c$ to be generated by the shunt regulator D1, which is fed back to the gate of the MOSFET Q1 via the resistor R2. The control current $I_c$ sets the MOSFET Q1 to a boundary mode of operation between an active region (e.g., where the MOSFET Q1 closes to conduct current) and a saturated region of the MOSFET Q1. This causes the output current Iout to be compensated and stabilized at the designated current transmit threshold, such as 250 milliamps or another value. Between the times at which the controller 104 is transmitting control signals, the load on the control buses DA1 or DA2 falls below the designated current transmit threshold (e.g., 250 milliamps), and the protection circuit assembly 106 returns to the mode of operation described above in connection with FIG. 4.

Figure 6:
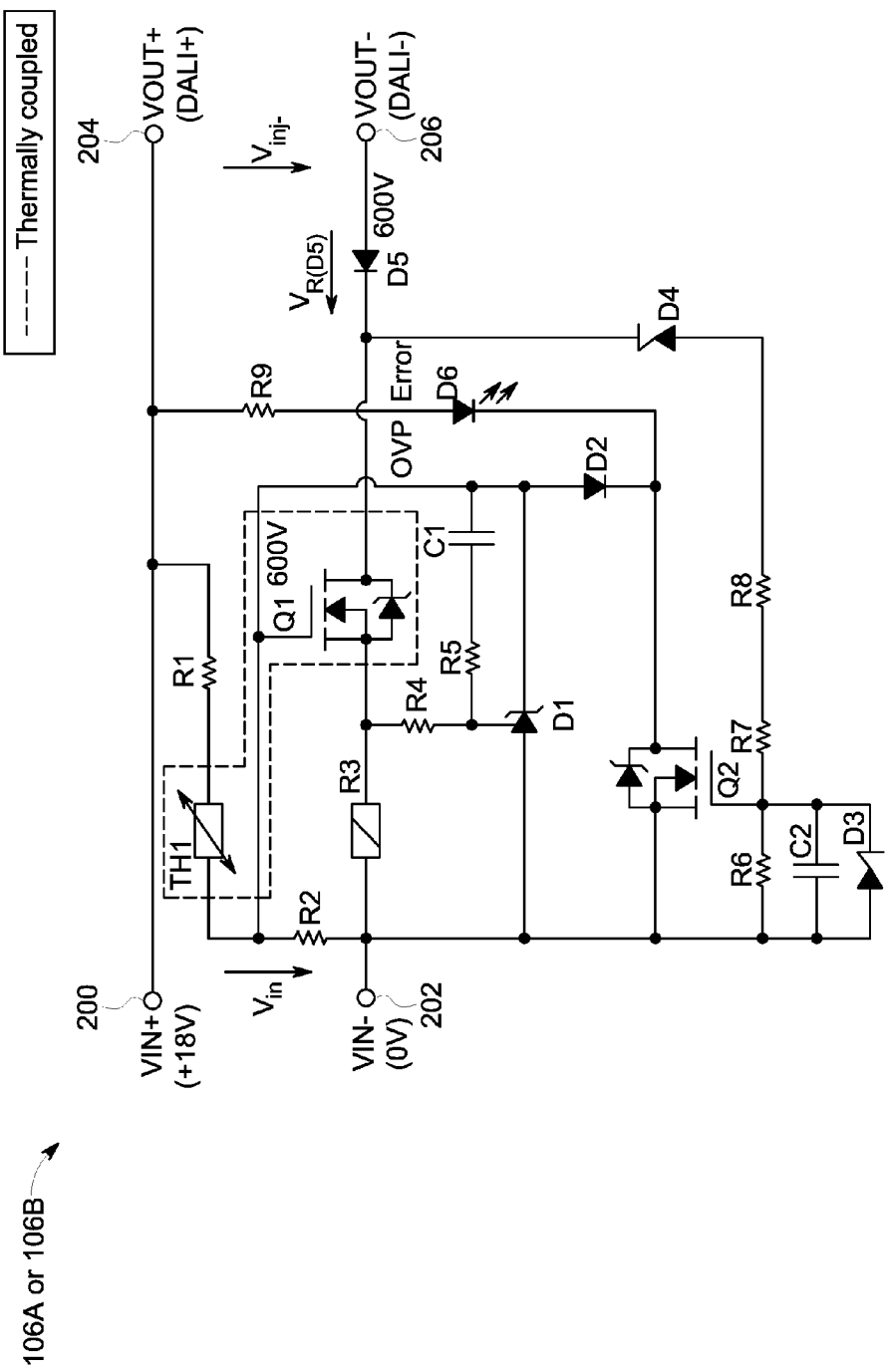
FIG. 6 illustrates one embodiment of the protection circuit of the protection circuit assembly shown in FIG. 2 operating during a closed circuit mode.

FIG. 6 illustrates one embodiment of the protection circuit assembly 106 operating during a closed circuit mode. The protection circuit assembly 106 can operate in the closed circuit mode responsive to one or more of the light sources 102 being miswired. Miswiring the light source 102 to the control buses DA1, DA2 and the mains voltage lines PE, V, L can cause a voltage $V_{inj-}$ that is injected into the negative output voltage connector 206 to be negative with respect to the positive voltage output connection 204. This can cause the series protection diode D5 to be reversed biased. The reverse biasing of the series protection diode D5 causes the diode D5 to only allow relatively small reverse leakage current $V_{R(D5)}$ to be conducted into the protection circuit assembly 106. This leakage current may be on the order of a few microamps (e.g., less than ten microamps). The value of the leakage current $V_{R(D5)}$ may be calculated as the difference between $V_{in}$ and $V_{inj-}$:

$$V_{R(D5)} = V_{inj-} - V_{in} \quad \text{(Eqn. 2)}$$

This relatively small leakage current has little to no effect on operation of other components of the protection circuit assembly 106. As a result, the remaining components of the protection circuit assembly 104 experience very little current conduction and the controller 104 is protected from large, damaging currents being conducted into the controller 104 even when a large, negative overvoltage is received on the negative output voltage connection 206.

Figure 7:
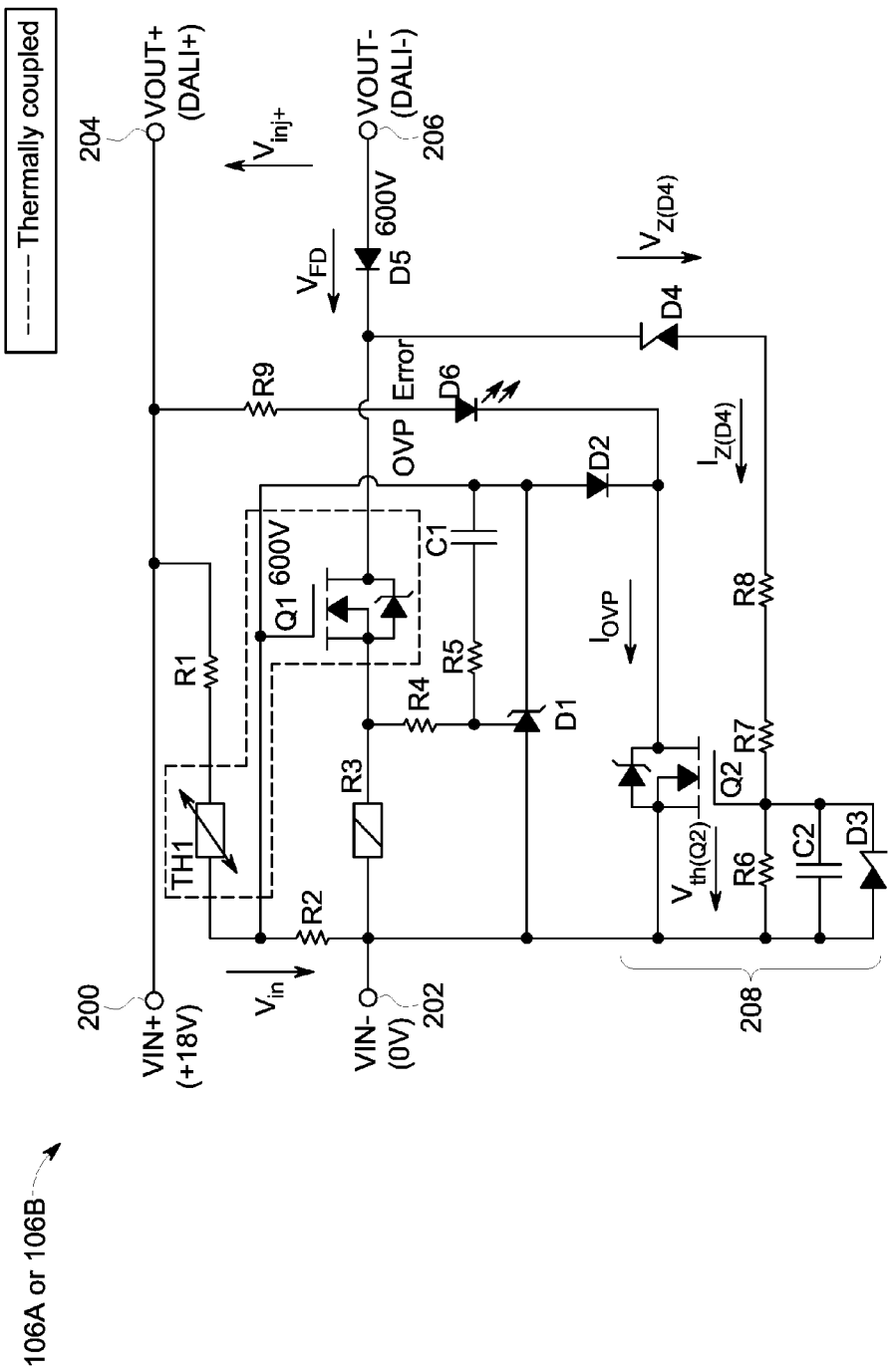
FIG. 7 illustrates another aspect of the protection circuit of the protection circuit assembly shown in FIG. 2 operating during the closed circuit mode.

FIG. 7 illustrates another aspect of the protection circuit assembly 106 operating during the closed circuit mode. In FIG. 7, a positive overvoltage ($V_{inj+}$) is injected onto the negative voltage output connection 206 such that the value of $V_{out-}$ on the negative voltage output connection 206 becomes positive with respect to the value of $V_{in+}$ on the positive voltage output connection 204. This positive overvoltage may be referred to as an injected disturbance voltage.

If the injected disturbance voltage is conducted on the control buses DA1 or DA2 (e.g., $V_{out-}$ becomes positive with respect to $V_{out+}$) and is relatively small (e.g., less than a first designated injection voltage threshold, such as ten volts of direct current or another value), the protection circuit assembly 106 continues to maintain the level of current conducted in the protection circuit assembly 106 between the input voltage connections 200, 202 and the output voltage connections 204, 206 to be no greater than the designated threshold (e.g., 250 milliamps). Because the power supply 108 that is connected to the input voltage connections 200, 202 provides a constant voltage in one embodiment, the power of the superimposed value of the positive voltage received on the positive voltage input connection 200 and the disturbance voltage $V_{inj+}$ multiplied by the 250 milliamp loop current can be dissipated on the MOSFET Q1. As a result, the controller 104 does not receive the overvoltage and is protected from damage.

At slightly elevated disturbance voltages, such as when the disturbance voltage is greater than the first injection voltage threshold but no greater than a second injection voltage threshold (e.g., the injected voltage is at least ten volts of direct current or ten volts of peak alternating current or more, but less than the avalanche voltage of the overvoltage sensing diode D4), the overvoltage protection stage 208 of the protection circuit assembly 106 is still inactive as the avalanche voltage of the overvoltage sensing diode D4 is larger than the voltage received from the power supply 108 on the positive input voltage connection 200. For example, the avalanche voltage of the diode D4 may be 27 to 32 volts (or another value) while the positive voltage received from the power supply 108 on the positive input voltage connection 200 is 18 to 20 volts (or another value). This prevents the diode D4 from conducting current through the diode D4 to the overvoltage protection stage 208 of the protection circuit assembly 100. Instead, this current is conducted to the MOSFET Q1 for dissipation.

As described above, the MOSFET Q1 may be thermally coupled with the variable resistor TH1. As the MOSFET Q1 dissipates the positive overvoltage, the temperature of the MOSFET Q1 increases. The temperature of the variable resistor TH1 increases with the increasing temperature of the MOSFET Q1. When the variable resistor TH1 reaches the Curie temperature of the variable of the variable resistor TH1, the resistance of the resistor TH1 significantly increases. The variable resistor TH1 may have a Curie temperature that is lower than an upper operating temperature limit of the MOSFET Q1, which represents an upper limit on the temperature that can be experienced by the MOSFET Q1 before the MOSFET Q1 is destroyed. For example, responsive to the temperature of the MOSFET Q1 and the variable resistor TH1 increasing by twenty to thirty degrees Centigrade, the resistance of the variable resistor TH1 may increase by two to three orders of magnitude. This increased resistance reduces the voltage conducted to the gate of the MOSFET Q1 to gradually lower the bias applied to the MOSFET Q1 and reduce the amount of current dissipated in or by the MOSFET Q1. As a result, less current is conducted to the controller 104 via the protection circuit assembly 100 to prevent damage to or destruction of the controller 104.

If the positive overvoltage $V_{inj+}$ received on the negative voltage output connection 206 becomes very large (e.g., larger than a third designated injection voltage threshold, such as a sum of the avalanche voltage of the avalanche diode D4 and the activation threshold of MOSFET Q2), then the MOSFET Q2 of the overvoltage protection stage 208 becomes activated from an inactive state to begin conducting current. For example, responsive to the positive overvoltage $V_{inj+}$ received on the negative voltage output connection 206 increasing to a value that is greater than the sum of the avalanche voltage of the avalanche diode D4 and the activation threshold of MOSFET Q2 (e.g., the gate voltage that closes the MOSFET Q2 and causes the MOSFET Q2 to begin conducting current), the MOSFET Q2 may be activated and begin conducting current. The activation of the MOSFET Q2 causes an overvoltage current low to begin flowing to the overvoltage protection stage 208 through the MOSFET Q2. The switching diode D2 becomes forward biased and the MOSFET Q1 is forced to cut off and no longer conduct current through the MOSFET Q1 (e.g., the MOSFET Q1 is deactivated).

Current from the overvoltage may be conducted through the avalanche diode D4 with the voltage $V_{Z(D4)}$ and the current $I_{Z(D4)}$ conducted through the diode D4 to the protection stage 208. A voltage $V_{th(Q2)}$ may be conducted out of the MOSFET Q2 to the capacitor C2, the diode D3, and the resistor R6, which operate as transient protection and stabilizing elements to prevent the current from conducting to and damaging or destroying the controller 104. For example, the current may be stored in and/or reduced by the capacitor C2, the diode D3, and/or the resistor R6 to prevent changes in the current from damaging the controller 104. The optional LED D6 may be activated by this current to generate light and indicate that the overvoltage protection stage 208 is active to prevent damage to the controller 104.

Responsive to viewing the light, an operator of the lighting system 100 may inspect and/or alter the wiring of the control buses DA1, DA2 and/or mains voltage lines PE, V, L for one or more of the light sources 102 to correct the wiring that activated the stage 208 and deactivate the LED D6.

Figure 8A:
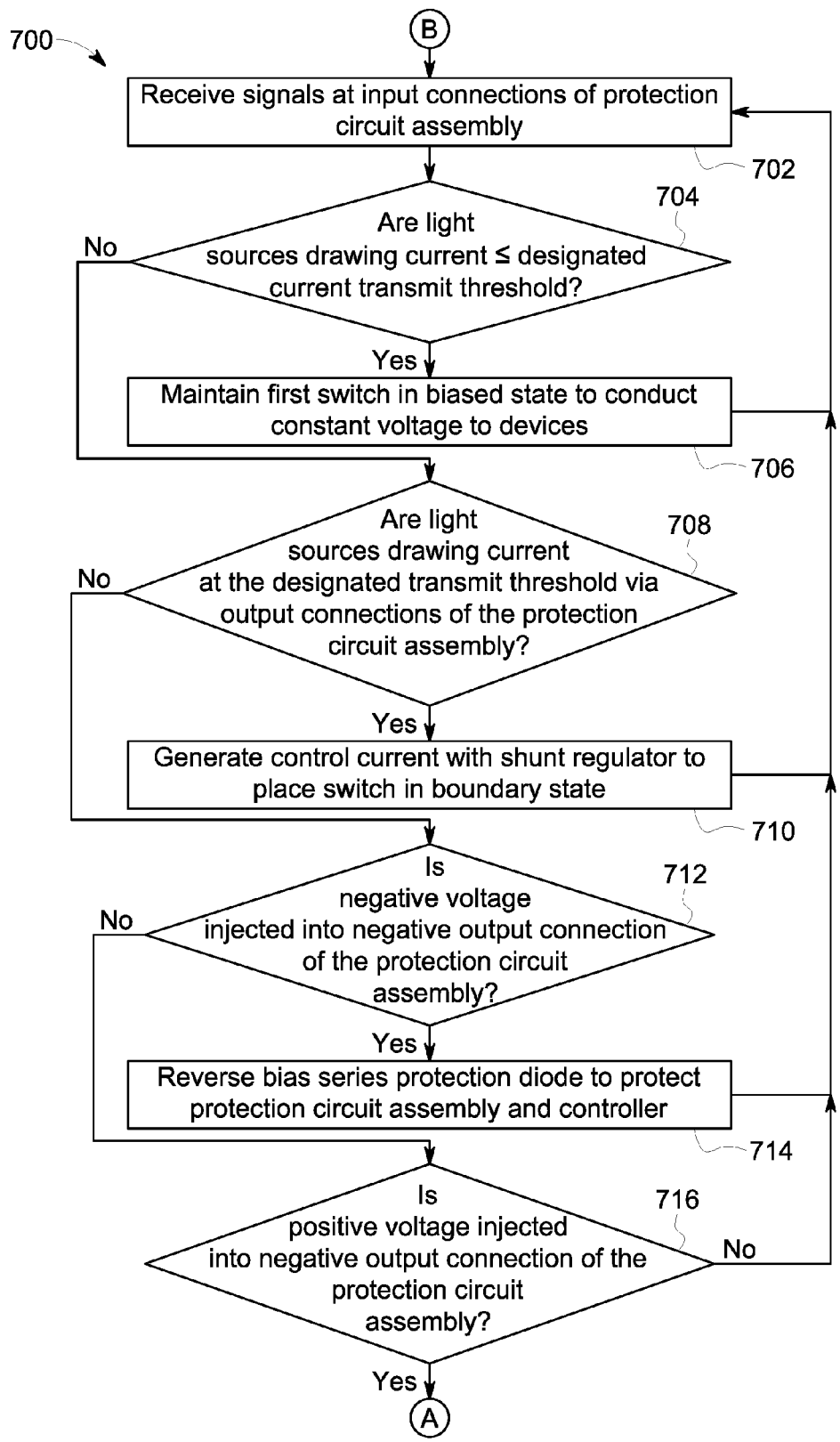
FIGS. 8A and 8B illustrate a flowchart of one embodiment of a method for protecting a lighting system.
Figure 8B:
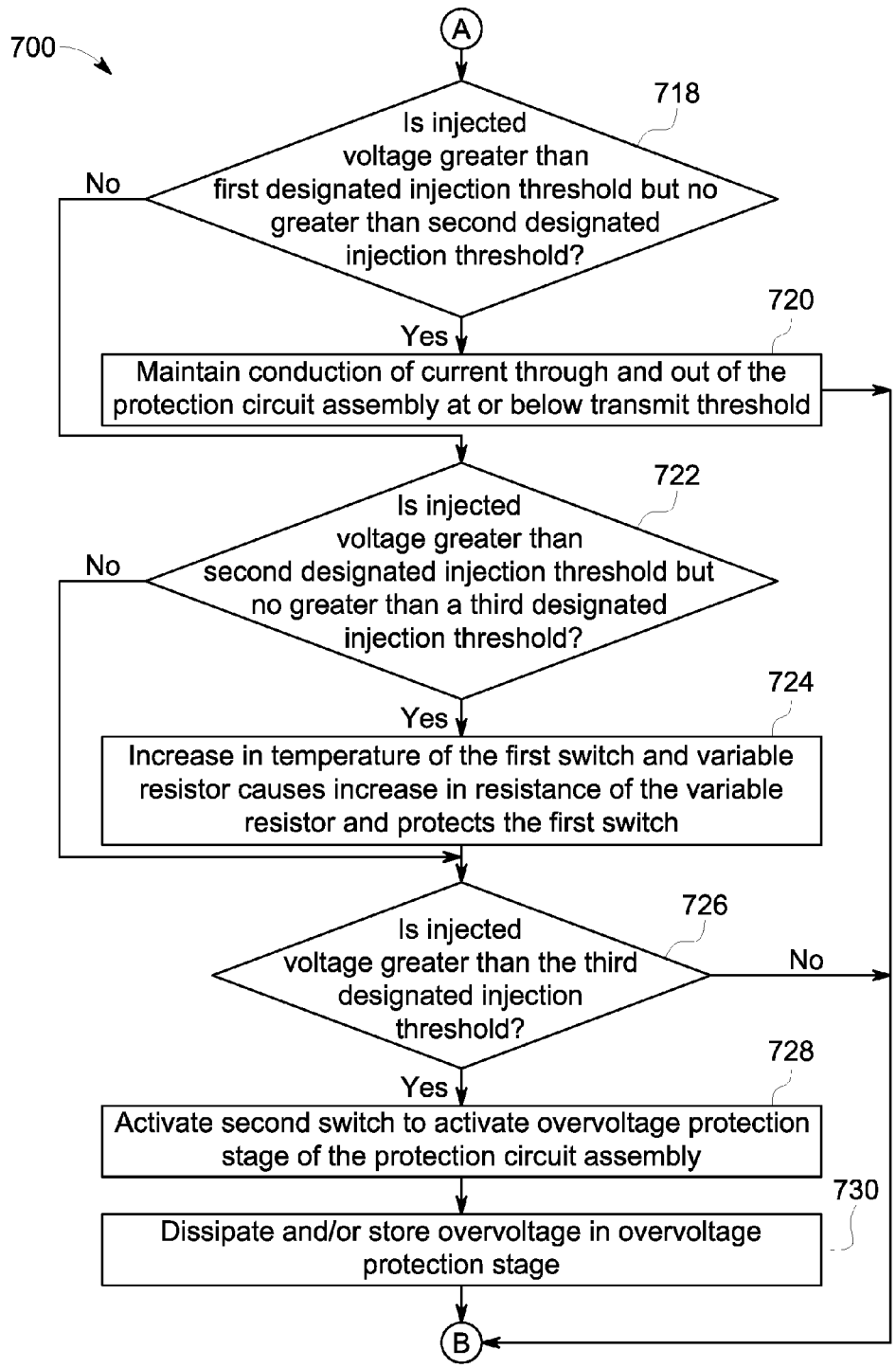

FIGS. 8A and 8B illustrate a flowchart of one embodiment of a method 700 for protecting a lighting system. The method 700 may be performed by one or more embodiments of the protection circuit assembly 106 described herein. In one embodiment, while the method 700 describes determinations or decisions being made in connection with various operations, one or more of these determinations or decisions may be made passively. For example, the determinations or decisions may be made by a passive electronic device changing an operative state (e.g., a diode becoming forward or reversed biased, a semiconductor switch changing regions, etc.) instead of an active electronic device making the determination or decision, such as a processor.

At 702 (shown in FIG. 7A), one or more signals form a controller are received at input connections of a protection circuit assembly. The signals may be received from the controller 104 shown in FIG. 2 to control the light sources 102 also shown in FIG. 2. At 704 (shown in FIG. 8A), a determination is made as to whether one or more of the light sources are drawing current from the protection circuit assembly and/or controller in an amount that is no greater than a designated current transmit threshold. For example, if the current being drawn by the light sources is equal to or less than 250 milliamps, then the light sources may be correctly wired with the protection circuit assembly 106 and the controller 104, and may be waiting for control signals from the controller 104 on the control buses DA1, DA2 shown in FIG. 2. As a result, flow of the method 700 may proceed toward 706 (shown in FIG. 8A). On the other hand, if the current being drawn by one or more of the light sources is greater than the transmit threshold, then one or more of the light sources may be communicating or receiving data on the control bus and/or be incorrectly wired to the protection circuit assembly and/or controller. As a result, flow of the method 700 can proceed toward 708 (shown in FIG. 8A).

At 706, a first semiconductor switch is biased to remain in a conductive state and conduct a constant voltage to the light sources (e.g., devices). For example, the MOSFET Q1 shown in FIGS. 3 through 7 may be biased to an active state or region to conduct the current through and out of the protection circuit assembly 106 to the light sources. Flow of the method 700 may then return toward 702 or may terminate.

At 708, a determination is made as to whether the light sources are drawing current from the protection circuit assembly at the designated transmit threshold via output connections of the protection circuit assembly. The light sources may draw current at the transmit threshold during time periods when the controller is communicating control signals to the light source(s) on the control bus and/or the light sources are communicating feedback signals to the controller via the protection circuit assembly on the control bus. The current drawn by the light sources may be at the current threshold when the drawn current is equivalent to the current threshold. Optionally, the current drawn by the light sources may be at the transmit threshold when the drawn current is equivalent to the transmit threshold or within a designated range, such as 1%, 3%, 5%, or the like. If the current drawn by the light sources is at the transmit threshold, then flow of the method 700 may proceed toward 710 (shown in FIG. 7A). But, if the current drawn by the light sources is greater than the threshold, then flow of the method 700 may proceed toward 712 (shown in FIG. 7A).

At 710, a control current is generated with a shunt regulator in the protection circuit assembly to place the first switch in a boundary state. For example, the control current $I_c$ may be generated by the shunt regulator D1. This current $I_c$ is fed back to the gate of the MOSFET Q1 to place the MOSFET Q1 in the boundary state or region. This stabilizes the current conducted in the protection circuit assembly to the designated transmit threshold, or within the designated range of this threshold. Flow of the method 700 may return toward 702 or terminate.

At 712, a determination is made as to whether a negative voltage is injected into the negative output connection of the protection circuit assembly. Such a negative voltage may be injected if one or more of the light sources has been incorrectly wired to the protection circuit assembly, such as when the control bus DA1, DA2 for a light source 102 is connected with the positive voltage output connection 204 of the protection circuit assembly 106 and/or the mains voltage line PE, V, L for the light source 102 is connected with the negative voltage output connection 204 of the protection circuit assembly 106. If a negative voltage is received into the protection circuit assembly via the negative output connection, then flow of the method 700 may proceed toward 714 (shown in FIG. 8A). Otherwise, flow of the method 700 may proceed toward 716 (shown in FIG. 8A).

At 714, a series protection diode connected with the negative output connection in the protection circuit assembly is reversed biased by the negative voltage injected into the negative output connection of the protection circuit assembly. This reverse biasing of the protection diode D5 prevents the negative voltage from being conducted through the protection circuit assembly to the controller to protect the components of the protection circuit assembly and the controller from damage or destruction. While a relatively small leakage voltage or current (e.g., less than 10%, 5%, 3%, 1%, or the like, of the injected negative voltage) may pass through the protection diode D5, this leakage voltage or current does not damage the protection circuit assembly or controller. Flow of the method 700 can return toward 702 or optionally terminate.

At 716, a determination is made as to whether a positive voltage is injected into the negative output connection of the protection circuit assembly. Such a positive voltage may be injected if one or more of the light sources has been incorrectly wired to the protection circuit assembly, such as when the control bus DA1, DA2 for a light source 102 is connected with the positive voltage output connection 204 of the protection circuit assembly 106 and/or the mains voltage line PE, V, L for the light source 102 is connected with the negative voltage output connection 204 of the protection circuit assembly 106. If a positive voltage is received into the protection circuit assembly via the negative output connection, then flow of the method 700 may proceed toward 718 (shown in FIG. 8B). Otherwise, flow of the method 700 may return toward 702 or terminate.

At 718, a determination is made as to whether the positive voltage injected into the negative output connection of the protection circuit assembly is greater than a first designated injection voltage threshold but no greater than a different, second designated injection voltage threshold. For example, if the injected voltage is small enough to allow the protection circuit to maintain the conduction of current at or below the transmit current threshold (e.g., less than ten volts or another value), then flow of the method 700 may proceed toward 720 (shown in FIG. 8B). At 720, the protection circuit may continue to operate as described above in connection with 702, 704, 706, 708, and/or 710 (shown in FIG. 8A), with any superimposed value of the injected voltage and the voltage received from the power supply multiplied by the control current ($I_c$) dissipated by the first switch (e.g., MOSFET Q1). Flow of the method 700 may then proceed toward 702. But, if the injected voltage is greater than the first injection voltage threshold (but smaller than the second injection voltage threshold), then flow of the method 700 may proceed from 718 toward 722 (shown in FIG. 8B).

At 722, a determination is made as to whether the injected voltage is greater than the second injection voltage threshold but no greater than a different, third designated injection voltage threshold. For example, a determination is made as to whether the injected voltage is too large to allow the protection circuit to maintain the conduction of current at or below the transmit current threshold (e.g., at least ten volts or another value), but is smaller than the avalanche voltage of the overvoltage sensing diode D4 (shown in FIGS. 3 through 7). If the injected voltage falls within this range, then flow of the method 700 may proceed toward 724 (shown in FIG. 8B). but, if the injected voltage does not fall within this range (e.g., the injected voltage is greater than the third injection voltage threshold, such as the avalanche voltage of the diode D4), then flow of the method 700 may proceed toward 726 (shown in FIG. 8B).

At 724, the temperature of the first switch increases (caused by dissipation of the injected voltage by the first switch), which also causes the temperature of the variable resistor to increase as the first switch and the variable resistor are thermally coupled. The increase in temperature of the variable resistor causes the resistance of the variable resistor to increase. The increase in resistance of the variable resistor protects the protection circuit and controller from damage or destruction by the injected voltage. Flow of the method 700 may then proceed toward 726.

At 726, a determination is made as to whether the injected voltage is greater than the third designated injection voltage threshold. For example, a determination may be made as to whether the injected voltage is greater than the avalanche voltage of the overvoltage sensing diode D4. If the injected voltage does exceed this threshold, then flow of the method 700 may proceed toward 728 (shown in FIG. 8B). Otherwise, flow of the method 700 may return toward 702 (shown in FIG. 8A). Optionally, the method 700 may remain at 726 until the temperature of the first switch and variable resistor decreases before returning toward 702.

At 728, a second switch is activated to activate an overvoltage protection stage of the protection circuit assembly. For example, the MOSFET Q2 may be activated by the current conducted through the overvoltage sensing diode D4 after the injected voltage exceeds the avalanche voltage of the diode D4. The activated MOSFET Q2 allows current to flow into the resistors, capacitors, and avalanche diode of the overvoltage protection stage of the protection circuit assembly. At 730 (shown in FIG. 8B), the injected voltage is dissipated and/or stored by the components of the overvoltage protection stage of the protection circuit assembly to prevent damage or destruction of the controller. Flow of the method 700 may remain at 728 until the injected voltage is removed or decreased, which may occur after wiring of one or more of the light sources is corrected. The method 700 may then return toward 702 (shown in FIG. 8A) or terminate.

In one embodiment, a lighting system includes plural protection circuits configured to be conductively coupled with a power supply that supplies current to plural light sources to power the light sources. The protection circuits are configured to receive an input voltage from the power supply and to conduct an output voltage to separate control buses that are conductively coupled with drivers of the light sources to conduct control signals to the drivers of the light sources for control of operation of the light sources. The system also includes a microcontroller configured to generate the control signals to control the operation of the light sources and plural transceiving circuits configured to receive the control signals from the microcontroller and to conduct the control signals to different groups of the light sources via the separate control buses. The protection circuits are separately connected to the separate control buses to conduct the output voltage from the power supply to the light sources. The protection circuits are configured to prevent an increase of voltage on a first control bus of the control buses from increasing voltage on a different, second control bus of the control buses.

In one aspect, the protection circuits are galvanically isolated from each other, the transceiving circuits are galvanically isolated from each other, and the control buses are galvanically isolated from each other.

In one aspect, at least one of the protection circuits includes a first semiconductor switch configured to be conductively coupled with input connections that receive the input voltage from the power supply and output connections that conduct the output voltage to at least one of the control buses in a location between the input connections and the output connections, and a variable resistor configured to be thermally coupled with the first semiconductor switch and conductively coupled with the input connections and the output connections. The variable resistor can have an electrical resistance that changes based on a change in temperature of the variable resistor. A temperature of the first semiconductor switch increases in response to a voltage being injected into at least one of the output connections that exceeds a second designated, non-zero injected voltage threshold. The increasing temperature of the first semiconductor switch causes the temperature of the variable resistor to increase. The increasing temperature in the variable resistor increases the electrical resistance of the variable resistor to protect the controller from the voltage that is injected into the at least one of the output connections.

In one aspect, the at least one of the protection circuits also include a series protection diode configured to be conductively coupled with the output connections between the at least one of the output connections and the first semiconductor switch. The series protection diode is configured to be reverse biased by the voltage that is injected to prevent conduction of the voltage to the controller when the voltage that is injected does not exceed a first designated, non-zero injected voltage threshold that is smaller than the second designated, non-zero injected voltage threshold.

In one aspect, the first semiconductor switch is configured to dissipate the voltage that is injected to protect the microcontroller when the voltage exceeds the first designated, non-zero injected voltage threshold but does not exceed the second designated, non-zero injected voltage threshold.

In one aspect, the output connections include a positive voltage output connection and a negative voltage output connection. The series protection diode is configured to be conductively coupled with the first semiconductor switch and the negative voltage output connection with an anode of the series protection diode configured to be conductively coupled with the negative voltage output connection and a cathode of the series protection diode configured to be conductively coupled with the first semiconductor switch.

In one aspect, the at least one of the protection circuits includes an overvoltage protection stage having a second semiconductor switch and one or more of a resistor or capacitor conductively coupled with the input connections and the output connections. The second semiconductor switch is configured to be activated responsive to the voltage that is injected exceeding a third designated, non-zero injected voltage threshold that is larger than the second designated, non-zero injected voltage threshold.

In one aspect, the overvoltage protection stage includes an avalanche diode configured to be conductively coupled with at least one of the output connections and the one or more of the resistor or capacitor in a location between the at least one of the output connections and the one or more of the resistor or capacitor. The third designated, non-zero injected voltage threshold is based on an activation voltage of the second semiconductor switch and an avalanche voltage of the avalanche diode.

In one aspect, the second semiconductor switch is configured to be activated to conduct the voltage that is injected into the one or more of the resistor or capacitor of the overvoltage protection stage for one or more of dissipation or storage of the voltage that is injected.

In one embodiment, a method includes receiving an input voltage from a power supply at plural protection circuits conductively coupled with the power supply to supply current to plural light sources to power the light sources, conducting an output voltage from the protection circuits to separate control buses that are conductively coupled with drivers of the light sources, and communicating control signals from a microcontroller to the drivers of the light sources via plural transceiving circuits and the control buses for control of operation of the light sources. The control signals can be separately communicated to different groups of the light sources via the separate control buses for separate control of the different groups of the light sources. The method also can include preventing (with the protection circuits) an increase of voltage on a first control bus of the control buses from increasing voltage on a different, second control bus of the control buses.

In one aspect, preventing the increase of voltage on the first control bus from increasing the voltage on the different, second control bus includes increasing a temperature of a first semiconductor switch in at least one of the protection circuits having input connections conductively coupled with the power supply to receive the input voltage, output connections configured to be conductively coupled with at least one of the control buses, and the first semiconductor switch conductively coupled with the input connections and the output connections in a location between the input connections and the output connections. The temperature of the first semiconductor switch increases responsive to a voltage being injected into at least one of the output connections that exceeds a second designated, non-zero injected voltage threshold. The method also can include increasing a temperature of a variable resistor in the at least one of the protection circuits that is thermally coupled with the first semiconductor switch and conductively coupled with the input connections and the output connections and increasing an electrical resistance of the variable resistor based on the temperature of the variable resistor increasing, wherein the electrical resistance of the variable resistor increases to protect the controller from the voltage that is injected into the at least one of the output connections.

In one aspect, the method also includes reverse biasing a series protection diode conductively coupled with at least one of the output connections between the at least one of the output connections and the first semiconductor switch. Reverse biasing the series protection diode prevents conduction of the voltage that is injected to the controller when the voltage that is injected does not exceed a first designated, non-zero injected voltage threshold that is smaller than the second designated, non-zero injected voltage threshold.

In one aspect, the method also includes dissipating the voltage that is injected with the first semiconductor switch to protect the microcontroller when the voltage exceeds the first designated, non-zero injected voltage threshold but does not exceed the second designated, non-zero injected voltage threshold.

In one aspect, the method also includes activating a second semiconductor switch of an overvoltage protection stage in the at least one of the protection circuits that also includes one or more of a resistor or capacitor conductively coupled with the input connections and the output connections. The second semiconductor switch can be activated responsive to the voltage that is injected exceeding a third designated, non-zero injected voltage threshold that is larger than the second designated, non-zero injected voltage threshold.

In one embodiment, a protection circuit assembly includes positive and negative voltage input connections configured to be conductively coupled with a power supply and positive and negative voltage output connections configured to be conductively coupled with separate control buses that are connected with light source drivers and light sources. The control buses are configured to communicate control signals from a microcontroller to the light source drivers to control operation of the light sources. The assembly also can include a first semiconductor switch having a gate coupled with the positive voltage input connection, a source coupled with the negative voltage input connection, and a drain coupled with the negative output voltage connection, and a variable resistor thermally coupled with the first semiconductor switch and conductively coupled with the positive voltage input connection and the gate of the first semiconductor switch. The variable resistor has an electrical resistance that changes based on a change in temperature of the variable resistor. A temperature of the first semiconductor switch increases in response to a voltage being injected into the negative voltage output connection that exceeds a second designated, non-zero injected voltage threshold. The increasing temperature of the first semiconductor switch causes the temperature of the variable resistor to increase. The increasing temperature in the variable resistor increases the electrical resistance of the variable resistor to protect the controller from the voltage that is injected into the at least one of the output connections.

In one aspect, the assembly also can include a series protection diode conductively coupled with the negative voltage output connection between the negative voltage output connection and the drain of the first semiconductor switch. The series protection diode can be configured to be reverse biased by the voltage that is injected to prevent conduction of the voltage to the controller.

In one aspect, the first semiconductor switch can be configured to dissipate the voltage that is injected to protect the controller when the voltage exceeds the first designated, non-zero injected voltage threshold but does not exceed a larger, second designated, non-zero injected voltage threshold.

In one aspect, an anode of the series protection diode is conductively coupled with the negative voltage output connection and a cathode of the series protection diode is conductively coupled with the first semiconductor switch.

In one aspect, the assembly also includes an overvoltage protection stage having a second semiconductor switch and one or more of a resistor or capacitor conductively coupled with the input connections and the output connections. The second semiconductor switch is activated responsive to the voltage that is injected exceeding a third designated, non-zero injected voltage threshold that is larger than the second designated, non-zero injected voltage threshold.

In one aspect, the overvoltage protection stage includes an avalanche diode conductively coupled with the negative voltage output connection and the one or more of the resistor or capacitor in a location between the at least one of the output connections and the one or more of the resistor or capacitor. The third designated, non-zero injected voltage threshold is based on an activation voltage of the second semiconductor switch and an avalanche voltage of the avalanche diode.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like).

Similarly, the programs may be standalone programs, may be incorporated as subroutines in an operating system, may be functions in an installed software package, and the like. The various embodiments are not limited to the arrangements and instrumentality shown in the drawings.

This written description uses examples to disclose several embodiments of the inventive subject matter and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A lighting system comprising:
   plural protection circuits configured to be conductively coupled with a power supply that supplies current to plural light sources to power the light sources, the protection circuits configured to receive an input voltage from the power supply and to conduct an output voltage to separate control buses that are conductively coupled with drivers of the light sources to conduct control signals to the drivers of the light sources for control of operation of the light sources;
   a microcontroller configured to generate the control signals to control the operation of the light sources; and
   plural transceiving circuits configured to receive the control signals from the microcontroller and to conduct the control signals to different groups of the light sources via the separate control buses,
   wherein the protection circuits are separately connected to the separate control buses to conduct the output voltage from the power supply to the light sources, and wherein the protection circuits are configured to prevent an increase of voltage on a first control bus of the control buses from increasing voltage on a different, second control bus of the control buses.

2. The lighting system of claim 1, wherein the protection circuits are gavlanically isolated from each other, the transceiving circuits are galvanically isolated from each other, and the control buses are galvanically isolated from each other.

3. The lighting system of claim 2, wherein the at least one of the protection circuits includes an overvoltage protection stage having a second semiconductor switch and one or more of a resistor or capacitor conductively coupled with the input connections and the output connections, wherein the second semiconductor switch is configured to be activated responsive to the voltage that is injected exceeding a third designated, non-zero injected voltage threshold that is larger than the second designated, non-zero injected voltage threshold.

4. The lighting system of claim 3, wherein the overvoltage protection stage includes an avalanche diode configured to be conductively coupled with at least one of the output connections and the one or more of the resistor or capacitor in a location between the at least one of the output connections and the one or more of the resistor or capacitor, wherein the third designated, non-zero injected voltage threshold is based on an activation voltage of the second semiconductor switch and an avalanche voltage of the avalanche diode.

5. The lighting system of claim 3, wherein the second semiconductor switch is configured to be activated to conduct the voltage that is injected into the one or more of the resistor or capacitor of the overvoltage protection stage for one or more of dissipation or storage of the voltage that is injected.

6. The lighting system of claim 1, wherein at least one of the protection circuits includes:
   a first semiconductor switch configured to be conductively coupled with input connections that receive the input voltage from the power supply and output connections that conduct the output voltage to at least one of the control buses in a location between the input connections and the output connections; and
   a variable resistor configured to be thermally coupled with the first semiconductor switch and conductively coupled with the input connections and the output connections, the variable resistor having an electrical resistance that changes based on a change in temperature of the variable resistor, wherein a temperature of the first semiconductor switch increases in response to a voltage being injected into at least one of the output connections that exceeds a second designated, non-zero injected voltage threshold, wherein the temperature increasing of the first semiconductor switch causes the temperature of the variable resistor to increase, and wherein the temperature increasing in the variable resistor increases the electrical resistance of the variable resistor to protect the controller from the voltage that is injected into the at least one of the output connections.

7. The lighting system of claim 6, wherein the at least one of the protection circuits also include a series protection diode configured to be conductively coupled with the output connections between the at least one of the output connections and the first semiconductor switch, the series protection diode configured to be reverse biased by the voltage that is injected to prevent conduction of the voltage to the controller when the voltage that is injected does not exceed a first designated, non-zero injected voltage threshold that is smaller than the second designated, non-zero injected voltage threshold.

8. The lighting system of claim 7, wherein the first semiconductor switch is configured to dissipate the voltage that is injected to protect the microcontroller when the voltage exceeds the first designated, non-zero injected voltage threshold but does not exceed the second designated, non-zero injected voltage threshold.

9. The lighting system of claim 7, wherein the output connections include a positive voltage output connection and a negative voltage output connection, and wherein the series protection diode is configured to be conductively coupled with the first semiconductor switch and the negative voltage output connection with an anode of the series protection diode configured to be conductively coupled with the negative voltage output connection and a cathode of the series protection diode configured to be conductively coupled with the first semiconductor switch.

10. A method comprising:
    receiving an input voltage from a power supply at plural protection circuits conductively coupled with the power supply to supply current to plural light sources to power the light sources;
    conducting an output voltage from the protection circuits to separate control buses that are conductively coupled with drivers of the light sources;
    communicating control signals from a microcontroller to the drivers of the light sources via plural transceiving circuits and the control buses for control of operation of the light sources, wherein the control signals are separately communicated to different groups of the light sources via the separate control buses for separate control of the different groups of the light sources; and
    preventing, with the protection circuits, an increase of voltage on a first control bus of the control buses from increasing voltage on a different, second control bus of the control buses.

11. The method of claim 10, wherein preventing the increase of voltage on the first control bus from increasing the voltage on the different, second control bus includes increasing a temperature of a first semiconductor switch in at least one of the protection circuits having input connections conductively coupled with the power supply to receive the input voltage, output connections configured to be conductively coupled with at least one of the control buses, and the first semiconductor switch conductively coupled with the input connections and the output connections in a location between the input connections and the output connections, wherein the temperature of the first semiconductor switch increases responsive to a voltage being injected into at least one of the output connections that exceeds a second designated, non-zero injected voltage threshold, and further comprising:
    increasing a temperature of a variable resistor in the at least one of the protection circuits that is thermally coupled with the first semiconductor switch and conductively coupled with the input connections and the output connections; and
    increasing an electrical resistance of the variable resistor based on the temperature of the variable resistor increasing, wherein the electrical resistance of the variable resistor increases to protect the controller from the voltage that is injected into the at least one of the output connections.

12. The method of claim 11, further comprising activating a second semiconductor switch of an overvoltage protection stage in the at least one of the protection circuits that also includes one or more of a resistor or capacitor conductively coupled with the input connections and the output connections, the second semiconductor switch activated responsive to the voltage that is injected exceeding a third designated, non-zero injected voltage threshold that is larger than the second designated, non-zero injected voltage threshold.

13. The method of claim 11, further comprising reverse biasing a series protection diode conductively coupled with at least one of the output connections between the at least one of the output connections and the first semiconductor switch, wherein reverse biasing the series protection diode prevents conduction of the voltage that is injected to the controller when the voltage that is injected does not exceed a first designated, non-zero injected voltage threshold that is smaller than the second designated, non-zero injected voltage threshold.

14. The method of claim 13, further comprising dissipating the voltage that is injected with the first semiconductor switch to protect the microcontroller when the voltage exceeds the first designated, non-zero injected voltage threshold but does not exceed the second designated, non-zero injected voltage threshold.

15. A protection circuit assembly comprising:
    positive and negative voltage input connections configured to be conductively coupled with a power supply;

positive and negative voltage output connections configured to be conductively coupled with separate control buses that are connected with light source drivers and light sources, the control buses configured to communicate control signals from a microcontroller to the light source drivers to control operation of the light sources;

a first semiconductor switch having a gate coupled with the positive voltage input connection, a source coupled with the negative voltage input connection, and a drain coupled with the negative output voltage connection;

a variable resistor thermally coupled with the first semiconductor switch and conductively coupled with the positive voltage input connection and the gate of the first semiconductor switch, the variable resistor having an electrical resistance that changes based on a change in temperature of the variable resistor, wherein a temperature of the first semiconductor switch increases in response to a voltage being injected into the negative voltage output connection that exceeds a second designated, non-zero injected voltage threshold, wherein the temperature increasing of the first semiconductor switch causes the temperature of the variable resistor to increase, and wherein the temperature increasing in the variable resistor increases the electrical resistance of the variable resistor to protect the controller from the voltage that is injected into the at least one of the output connections.

16. The protection circuit assembly of claim 15, further comprising an overvoltage protection stage having a second semiconductor switch and one or more of a resistor or capacitor conductively coupled with the input connections and the output connections, wherein the second semiconductor switch is activated responsive to the voltage that is injected exceeding a third designated, non-zero injected voltage threshold that is larger than the second designated, non-zero injected voltage threshold.

17. The protection circuit assembly of claim 16, wherein the overvoltage protection stage includes an avalanche diode conductively coupled with the negative voltage output connection and the one or more of the resistor or capacitor in a location between the at least one of the output connections and the one or more of the resistor or capacitor, wherein the third designated, non-zero injected voltage threshold is based on an activation voltage of the second semiconductor switch and an avalanche voltage of the avalanche diode.

18. The protection circuit assembly of claim 15, further comprising a series protection diode conductively coupled with the negative voltage output connection between the negative voltage output connection and the drain of the first semiconductor switch, the series protection diode configured to be reverse biased by the voltage that is injected to prevent conduction of the voltage to the controller.

19. The protection circuit assembly of claim 18, wherein the first semiconductor switch is configured to dissipate the voltage that is injected to protect the controller when the voltage exceeds the first designated, non-zero injected voltage threshold but does not exceed a larger, second designated, non-zero injected voltage threshold.

20. The protection circuit assembly of claim 18, wherein an anode of the series protection diode is conductively coupled with the negative voltage output connection and a cathode of the series protection diode is conductively coupled with the first semiconductor switch.

* * * * *